United States Patent
Hirai (10) Patent No.: US 11,968,025 B2
(45) Date of Patent: Apr. 23, 2024

(54) DETECTION OF INTERFERENCE BETWEEN MULTIFEEDER LINKS IN HAPS COMMUNICATION SYSTEM

(71) Applicant: SoftBank Corp., Tokyo (JP)

(72) Inventor: Ryoji Hirai, Tokyo (JP)

(73) Assignee: SoftBank Corp., Tokyo (JP)

(*) Notice: Subject to any disclaimer, the term of this patent is extended or adjusted under 35 U.S.C. 154(b) by 341 days.

(21) Appl. No.: 17/442,174

(22) PCT Filed: Feb. 12, 2020

(86) PCT No.: PCT/JP2020/005345
§ 371 (c)(1),
(2) Date: Sep. 23, 2021

(87) PCT Pub. No.: WO2020/195270
PCT Pub. Date: Oct. 1, 2020

(65) Prior Publication Data
US 2022/0182132 A1 Jun. 9, 2022

(30) Foreign Application Priority Data
Mar. 26, 2019 (JP) ................. 2019-057729

(51) Int. Cl.
*H04B 7/185* (2006.01)
*H04W 16/28* (2009.01)

(52) U.S. Cl.
CPC ........ *H04B 7/18506* (2013.01); *H04W 16/28* (2013.01)

(58) Field of Classification Search
CPC ...... H04B 7/024; H04B 7/0617; H04B 7/185; H04B 7/18504; H04B 7/18506;
(Continued)

(56) References Cited

U.S. PATENT DOCUMENTS 8,238,818 B2 * 8/2012 Karabinis ............ H04B 7/0408
455/12.1
8,744,360 B2 * 6/2014 Zheng ................ H04B 7/18563
455/12.1
(Continued)

FOREIGN PATENT DOCUMENTS

CN 106209207 A 12/2016
WO WO 2018/207612 A1 11/2018

OTHER PUBLICATIONS

Kazuki Maruta, et al., "Interference Suppression Schemes for Pilot Decontamination on Multicell Massive MIMO Systems," The Institute of Electronics Information and Communication Engineers, IEICE Technical Report, RSC2018-177, Oct. 2018.
(Continued)

*Primary Examiner* — Siu M Lee
(74) *Attorney, Agent, or Firm* — Muirhead and Saturnelli, LLC (57) ABSTRACT

It is detected of an interference between feeder links of communication relay apparatus, which tends to occur when the number of movable aerial-floating type communication relay apparatus increases in a same area. Plural feeder-link model elements are generated with respect to the plural communication relay apparatuses, wherein each of which a feeder-link receiving point corresponding to a position of the communication relay apparatus, a feeder-link transmitting point corresponding to a position of a gateway station, and a line segment connecting the feeder-link receiving point and the feeder-link transmitting point to each other in a three-dimensional space model. An occurrence of interference between feeder links is determined based on distances between the line segment and the feeder-link receiving point among feeder-link model elements different from each other on the three-dimensional space model.

20 Claims, 8 Drawing Sheets

(58) Field of Classification Search
CPC .... H04B 17/345; H04B 17/391; H04B 17/40; H04W 16/26; H04W 16/28; H04W 88/04; H04W 88/08
See application file for complete search history.

(56) References Cited

U.S. PATENT DOCUMENTS

| | | |
|---|---|---|
| 9,798,329 B2 | 10/2017 | Shattil |
| 2006/0205347 A1* | 9/2006 | Karabinis ............ H04B 7/2041 455/12.1 |
| 2016/0046387 A1 | 2/2016 | Frolov et al. |
| 2017/0126309 A1 | 5/2017 | Rupasinghe et al. |
| 2018/0019516 A1 | 1/2018 | Teague |

OTHER PUBLICATIONS

Takafumi Fujii, et al., "Interference Cancelation for Reverse-Link in HAPS Multi-Gateway Feeder Link System," Sep. 10, 2019.

* cited by examiner

FIG. 9 though the present invention does not include this content.

DETECTION OF INTERFERENCE BETWEEN MULTIFEEDER LINKS IN HAPS COMMUNICATION SYSTEM

TECHNICAL FIELD

The present invention relates to a detection (including an advance prediction) of an interference between multi-feeder links of an aerial-floating type radio relay apparatus such as a HAPS suitable for constructing a three-dimensional network.

BACKGROUND ART

There is conventionally known a communication relay apparatus such as a high altitude platform station (HAPS) (also referred to as "high altitude pseudo satellite") that can float and stay in an airspace (for example, see Patent Literature 1). A communication line in this aerial-floating type communication relay apparatus is configured with a feeder link between the communication relay apparatus and a gateway (GW) station on a mobile communication network side, and a service link between the communication relay apparatus and a terminal apparatus.

CITATION LIST

Patent Literature

Patent Literature 1: U.S. Patent Application Publication No. 2016/0046387.

SUMMARY OF INVENTION

Technical Problem

If the number of movable aerial-floating type radio relay apparatuses increases in a same area, an interference may occur between the feeder links of plural communication relay apparatuses, which may lead to deteriorate a radio communication quality of the feeder link or disconnect the feeder link.

Solution to Problem

An interference detection system according to an aspect of the present invention is an interference detection system for detecting an interference between feeder links of plural movable aerial-staying type communication relay apparatuses, each of the communication relay apparatuses including a relay communication station for relaying a radio communication of a terminal apparatus. The interference detection system comprises an information storage section that stores position information of plural gateway stations for respectively performing a radio communication with the plural communication relay apparatuses, an information acquisition section that acquires position information on current positions of the plural communication relay apparatuses, a generation section that generates plural feeder-link model elements with respect to the plural communication relay apparatuses based on the position information of the plural communication relay apparatuses and the position information of the plural gateway stations, each of the plural feeder-link model elements combining a feeder-link receiving point corresponding to the position of the communication relay apparatus, a feeder-link transmitting point corresponding to the position of the gateway station, and a line segment connecting the feeder-link receiving point and the feeder-link transmitting point to each other in a three-dimensional space model, and a determination section that determines an occurrence of interference between the feeder links based on distance between the line segment and the feeder-link receiving point among the plural feeder-link model elements different from each other on the three-dimensional space model.

In the foregoing interference detection system, the generation section may generate the feeder-link model element by further combining with a sphere centered on the feeder-link receiving point, and the determination section may determine the occurrence of interference between the feeder links based on a contact between the line segment and the sphere among the plural feeder-link model elements different from each other on the three-dimensional space model.

Herein, the generation section may change a radius of the sphere of the feeder-link model element depending on a required sensitivity of an interference detection between the feeder links.

In the foregoing interference detection system, the line segment may include a shape corresponding to a transmission beam of the feeder link from the gateway station.

In the foregoing interference detection system, the interference detection system may further comprise an output section that outputs at least one of a determination result of the interference occurrence between the feeder links and the plural feeder-link model elements in the three-dimensional space model.

In the foregoing interference detection system, the generation section may generate by predicting movements of the plural feeder-link model elements based on a flight-affecting condition parameter including at least one of flight schedule information of the communication relay apparatus, a meteorological conditions affecting the flight of the communication relay apparatus, and an altitude and a velocity of the communication relay apparatus, and the determination section may predict the occurrence of an interference between the feeder links based on a prediction result of the movements of the plural feeder-link model elements.

Herein, the movements of the plural feeder-link model elements or the interference occurrence between the feeder links may be predicted based on past data indicating the relationship between the flight-affecting condition parameter and a flight path of the communication relay apparatus.

An interference detection method according to yet another aspect of the present invention is an interference detection method for detecting an interference between feeder links of plural movable aerial-staying type communication relay apparatus, each of the communication relay apparatuses including a relay communication station that relays a radio communication of a terminal apparatus. The interference detection method includes storing position information of plural gateway stations that respectively perform a radio communication with the plural communication relay apparatuses, acquiring position information on current positions of the plural communication relay apparatuses, generating plural feeder-link model elements with respect to the plural communication relay apparatuses based on the position information of the plural communication relay apparatuses and the position information of the plural gateway stations, each of the plural feeder-link model elements combining a feeder-link receiving point corresponding to the position of the communication relay apparatus, a feeder-link transmitting point corresponding to the position of the gateway station, and a line segment connecting the feeder-link receiving point and the feeder-link transmitting point to each other in a three-dimensional space model, and determining an occurrence of interference between the feeder links based on distance between the line segment and the feeder-link receiving point among the plural feeder-link model elements different from each other on the three-dimensional space model.

A program according to yet another aspect of the present invention is a program executed by a computer or a processor installed in an interference detection system for detecting an interference between feeder links of plural movable aerial-staying type communication relay apparatuses, each of the communication relay apparatuses including a relay communication station that relays a radio communication of a terminal apparatus. The program includes a program code for generating plural feeder-link model elements with respect to the plural communication relay apparatuses based on position information of the plural communication relay apparatuses and position information of plural gateway stations respectively performing a radio communication with the plural communication relay apparatuses, each of the plural feeder-link model elements combining a feeder-link receiving point corresponding to a position of the communication relay apparatus, a feeder-link transmitting point corresponding to a position of the gateway station, and a line segment connecting the feeder-link receiving point and the feeder-link transmitting point to each other in a three-dimensional space model, and a program code for determining an occurrence of interference between the feeder links based on distance between the line segment and the feeder-link receiving point among the plural feeder-link model elements different from each other on the three-dimensional space model.

According to the present invention, it is possible to detect (including a predictive detection) an interference between feeder links of plural communication relay apparatuses, which tends to occur when the number of movable aerial-floating type communication relay apparatuses increases.

DESCRIPTION OF EMBODIMENTS

Hereinafter, embodiments of the present invention are described with reference to the drawings.

Figure 1:
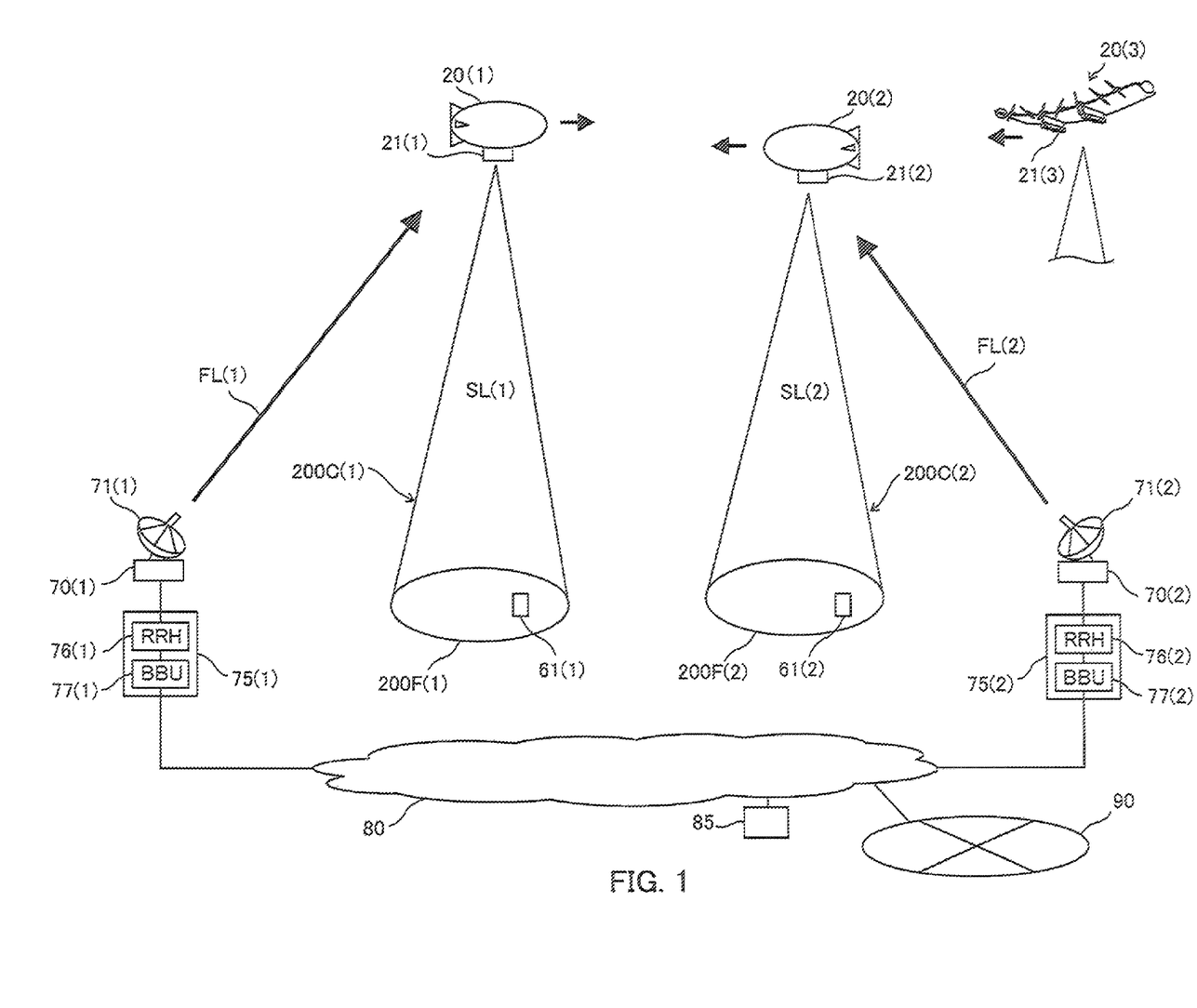
FIG. 1 is an illustration showing an example of a communication system according to an embodiment of the present invention.

FIG. 1 is an illustration showing an example of a communication system according to an embodiment of the present invention. The communication system according to the present embodiment is suitable for realizing a three-dimensional network of fifth-generation mobile communication that supports simultaneous connection to a large number of terminal apparatuses, and low delay, etc.

As shown in FIG. 1, the communication system is provided with plural High-Altitude Platform Stations (HAPS) (also called "high altitude pseudo satellite" or "stratified platform") 20(1) to 20(3) as plural aerial-floating type communication relay apparatuses (radio relay apparatuses). The HAPSs 20(1) to 20(3) are located in an airspace at a predetermined altitude, and forms three-dimensional cell (three-dimensional area) in a cell-formation target airspace at a predetermined altitude. The HAPSs 20(1) to 20(3) are floating objects or flying objects (for example, airship, solar plane), which are controlled by autonomous control or external control so as to float or fly and be located in an airspace (floating airspace) with high altitude of 100 [km] or less from the ground level or the sea level, equipped with relay communication stations 21(1) to 21(3).

It is noted that, in the example of FIG. 1, although examples, in which HAPSs 20(1) and 20(2) are airship type HAPS, solar-plane type HAPSs (illustrations such as feeder links are omitted), and three HAPSs 20(1) to 20(3) are in flight, are shown, the number of HAPSs may be 2 or 4 or more. The type of HAPS may be different from that of the airship and the solar plane. Further, in the following description, in case that plural HAPSs and those relay communication stations are not distinguished, they are referred to as HAPS 20, relay communication station 21, etc. without parenthesized numbers.

The airspace in which the HAPS 20 is located is, for example, a stratospheric airspace with altitude greater than 11 [km] and less than 50 [km] on the ground (or on the water such as the sea or lake). The airspace may be an airspace in an altitude of 15 [km] or more and 25 [km] or less where weather conditions are relatively stable, and may be an airspace with altitude of about 20 [km] in particular.

The cell-formation target airspace, which is a target airspace for forming a three-dimensional cell with one or two or more HAPS 20 according to the communication system in the present embodiment, is an airspace in a predetermined altitude range (for example, altitude range of 50 [m] or more and 1000 [m] or less) located between the airspace where the HAPS 20 is located and a cell-formation spatial area near the ground level covered by a base station (for example, LTE eNodeB) such as a conventional macro-cell base station.

It is noted that, the cell-formation target airspace where the three-dimensional cell in the present embodiment is formed may be an airspace over the sea, a river or a lake. Further, the three-dimensional cell formed by the HAPS 20 may be formed so as to reach the ground level or the sea level so that it can communicate with a terminal apparatus 61 located on the ground or on the sea.

The relay communication station 21 of the HAPS 20 forms plural beams for wirelessly communicating with the terminal apparatus 61 that is a mobile station, toward the ground by an antenna for service link (hereinafter referred to as "SL antenna"). The terminal apparatus 61 may be a communication terminal module incorporated in a drone that is an aircraft such as a small helicopter capable of remotely steering, or may be a user apparatus used by a user in an airplane.

An area through which a beam of a service link formed by the HAPS 20 passes in a cell-formation target airspace is a three-dimensional cell. For example, the areas through which the beams of the service link respectively formed by the HAPSs 20(1) and 20(2) passes are a first cell 200C(1) and a second cell 200C(2). In FIG. 1, a terminal apparatus 61(1) is located in the first cell 200C(1), and a terminal apparatus 61(2) is located in the second cell 200C(2).

The relay communication station 21 of the HAPS 20 is a slave repeater that wirelessly communicates with plural gateway stations (also called "feeder station", hereinafter referred to as "GW station") 70 as relay stations (master repeater) connected to a base station 75 on the ground (or on the sea) side. For example, the relay communication station 21(1) of the HAPS 20(1) is a slave repeater that wirelessly communicates with a GW station 70(1) connected to a base station 75(1), and the relay communication station 21(2) of the HAPS 20(2) is a slave repeater that wirelessly communicates with a GW station 70(2) connected to a base station 75(2). The relay communication station 21 is connected to a core network 80 of a mobile communication network via the GW station 70 and the base station 75 disposed on the ground or on the sea, and is capable of performing a radio communication therewith by an antenna for feeder link (hereinafter referred to as "FL antenna"). The GW station 70 for each HAPS may be located at each of the sites different from each other on the ground or on the sea, or may be located at the same site. Further, a communication of feeder link between the relay communication station 21 of the HAPS 20 and the GW station 70 may be performed by a radio communication using a radio wave such as a microwave, or may be performed by an optical communication using a laser light or the like.

The GW station 70 may control its own antenna (hereinafter referred to as "GW antenna") 71 so as to track the HAPS 20 moving in the airspace. By tracking the HAPS 20 by the GW antenna 71, even when using the GW antenna 71 with high directivity such as a parabolic antenna, it is capable of suppressing the deterioration of the communication quality of the feeder link due to the movement of the HAPS 20.

As a control system of a directional beam of the GW antenna 71, it is capable of using various kinds of systems such as a gimbal system, an electric system (360-degrees beamforming control system), and an electric system (angle-limited beamforming control system+antenna switching).

The base station 75 is configured with, for example, in the case of LTE eNodeB, a remote radio head (RRH (Remote Radio Head), also called RRU (Remote Radio Unit)) 76 and a baseband unit (BBU (Base Band Unit)) 77. The RRH 76 and the BBU 77 may be disposed respectively apart from each other by connecting therebetween with an optical fiber line. Further, the plural BBU 77(1) and 77(2) may be aggregated and disposed in one place.

The RRH 76 is provided with, for example, an orthogonal modulation/demodulation section, a transmission section, a reception section, a power amplifier (PA (Power Amplifier)) and a low noise receiver (LNA (Low Noise Amplifier)), and is connected to the GW station 70. The orthogonal modulation/demodulation section performs an orthogonal modulation/demodulation of an OFDM signal processed by the BBU and converts it into an analog signal (RF signal). The transmission section converts the frequency of the RF signal generated by the orthogonal modulation/demodulation section into a frequency to be transmitted as a radio wave. The reception section converts the frequency of the high-frequency signal of the received radio wave into a frequency to be processed by the orthogonal modulation/demodulation section. The power amplifier (PA) amplifies the power of RF signal generated by the transmission section. The low noise receiver (LNA) amplifies the received weak radio waves and passes them to the reception section.

The BBU 77 is provided with, for example, a base-station control section, a transmission-line interface section, a timing control section, and a baseband section, and is connected to the core network 80 of the mobile communication network via a predetermined interface (for example, the Si interface). The base-station control section controls the entire base station and performs a call control protocol, a control monitoring, and so on. The transmission-line interface section is connected to a packet transmission line such as an Ethernet (registered trademark) between the own section and the core network or the like, and performs transmission and reception of IP packets by processing a predetermined protocol. The timing control section generates various kinds of clocks to be used inside the base station based on a reference clock extracted from the signal received via the packet transmission path or the GNSS (Global Navigation Satellite System) reception signal from an artificial satellite. The baseband section converts (modulates and demodulates) between the IP packet transmitted and received through the transmission-line interface section and the OFDM signal (baseband signal) which is a radio signal.

Each of the HAPS 20 may autonomously control a floating movement (flight) of HAPS itself and a process in the relay communication station 21 by executing a control program with a control section including a computer or the like incorporated inside of the HAPS. For example, each of the HAPS 20 may acquire current position information of the HAPS itself (for example, GPS position information), position control information (for example, flight schedule information) stored in advance, position information of another HAPS located in a peripheral space or the like, and may autonomously control a floating movement (flight) and a process in the relay communication station 21 based on these pieces of information.

Further, the floating movement (flight) of each of the HAPS 20 and the process in the relay communication station 21 may be controlled by a central control server 85 as a remote control apparatus provided in a communication center or the like which is connected to the core network 80 of the mobile communication network. The central control server 85 can be configured with, for example, a computer apparatus such as a PC or a server that can read and execute a program. In this case, the HAPS 20 includes a control communication section (for example, a mobile communication module) described below for receiving control information from the central control server 85 and transmitting various kinds of information such as monitoring information to a predetermined destination such as the central control server 85. The control communication section may be assigned terminal identification information (for example, IP address, phone number, etc.) so as to communicate with the central control server 85. The MAC address of the communication interface may be used to identify the control communication section of the HAPS 20.

Transmission/reception of control information and monitoring information between the HAPS 20 and the central control server 85 can be performed, for example, via an LTE communication line via the core network 80 of the mobile communication network, the base station 75 and the GW station 70. Further, the transmission/reception of control information and monitoring information may be performed using a satellite line for mobile communication via an artificial satellite, or may be performed using a satellite line via the Internet 90 and an artificial satellite.

The monitoring information transmitted from the HAPS 20 may include at least one of information regarding the floating movement (flight) of the HAPS itself or a surrounding HAPS and/or the process in the relay communication station 21, reception monitor information that the HAPS 20 obtains by measuring the reception power of the feeder link with the GW station 70, information regarding a status of the HAPS 20, and information of observation data acquired by various kinds of sensors and the like. Further, the monitoring information may include at least one of information on current position and attitude, flight route information (flight schedule information, flight-route history information), velocity relative to the air, velocity relative to the ground and propulsion direction of the HAPS 20, wind velocity and wind direction of the airflow around the HAPS 20, and atmospheric pressure and temperature around the HAPS 20. The control information may include information on target flight route of the HAPS 20.

The HAPS 20 and the central control server 85 may acquire weather forecast information for an area including a radio propagation path of a feeder link, maintenance schedule information of the GW station 70 or the base station 75, reception-level monitor information of the feeder link with the GW station 70 which is measured by the HAPS 20, flight path information of the HAPS 20, current position information and attitude information of the HAPS20, and position information of the GW station 70. These pieces of information may be acquired, for example, from the server of the core network (mobile communication network) 80 or the server of the Internet 90, which manages each piece of information. Further, the central control server 85 may acquire the maintenance schedule information of the GW station 70 or the base station 75 from the GW station 70 or the base station 75 via the core network 80 of the mobile communication network by a predetermined interface (for example, the Si interface of the LTE), or may acquire the maintenance schedule information from the management server that manages the GW station 70 or the base station 75.

Duplex methods of uplink and downlink for radio communication with the relay communication station 21 and the terminal apparatus 61 are not limited to specific methods, and may be, for example, a time division duplex method (Time Division Duplex: TDD) or a frequency division duplex method (Frequency Division Duplex: FDD). An access method for radio communication with the relay communication station 21 and the terminal apparatus 61 is not limited to the specific method, but may be, for example, FDMA (Frequency Division Multiple Access) method, TDMA (Time Division Multiple Access) method, CDMA (Code Division Multiple Access) method, or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using plural antennas for both of transmission and reception. The MIMO technology may be an SU-MIMO (Single-User MIMO) technology in which one base station transmits plural signals to one terminal apparatus on the same time/same frequency, and may be an MU-MIMO (Multi-User MIMO) technology in which one base station transmits signals to plural different communication terminal apparatuses on the same time/same frequency or plural different base stations transmit signals to one terminal apparatus on the same time/same frequency.

It is noted that, in the following embodiments, although it is illustrated and described regarding some cases in which a communication relay apparatus having the relay communication station 21 that wirelessly communicates with the terminal apparatus 61 is an unmanned airship type HAPS 20, the communication relay apparatus may be a solar-plane type HAPS. Further, the following embodiments can be similarly applied to aerial-floating type communication relay apparatuses other than the HAPS.

A link between the HAPS 20 and the base station 75 via the GW station 70 is referred to as "feeder link (FL)", and a link between the HAPS 10 and the terminal apparatus 61 is referred to as "service link (SL)". In particular, a spatial section between the HAPS 20 and the GW station 70 is referred to as a "radio section of feeder link". Further, a downlink of a communication from the GW station 70 to the terminal apparatus 61 via the HAPS 20 is also referred to as a "forward link", and an uplink of a communication from the terminal apparatus 61 to the GW station 70 via the HAPS 20 is also referred to as a "reverse link".

In FIG. 1, although the HAPS 20 is located, for example, in the stratosphere with an altitude of about 20 km, and forms one feeder link with one GW station 70, the HAPS 20 forms one cell 200C, and a diameter of a service area consisting of a footprint 200F of the cell 200C is, for example, 100 to 200 km, it is not limited to these examples. For example, the number of cells formed by the HAPS 20 may be 2 or more. Further, the HAPS 20 may form plural feeder links with the plural GW stations 70.

In the communication system of the present embodiment having the configuration mentioned above, when the number of HAPSs 20 capable moving in an upper airspace increases in a same common area, an interference may occur between the feeder links of plural HAPSs 20 depending on the flight path and frequency used in each HAPS 20. For example, when a feeder-link receiving section of one HAPS among the plural HAPSs 20 flying in the common area also receives the signal of the feeder link for another HAPS, an interference between the feeder links may occur. If the interference between the feeder links occurs, the radio communication quality of the feeder link of the HAPS 20 may deteriorate or the feeder link may be disconnected.

Therefore, the communication system of the present embodiment includes an interference detection system that detects the occurrence of interference between the feeder links of the HAPS 20 (including the case of predictive detection of the interference) based on the position information on the HAPS 20 and the GW station 70. It is noted that, although it is described of the case where the central control server 85 has a function of the interference detection system in the present embodiment, an interference detection system configured with a single computer apparatus or plural computer apparatuses may be provided separately from the central control server 85. Further, the function of the interference detection system may be incorporated into any of the HAPS 20, the GW station 70 and the base station 75.

Figure 2:
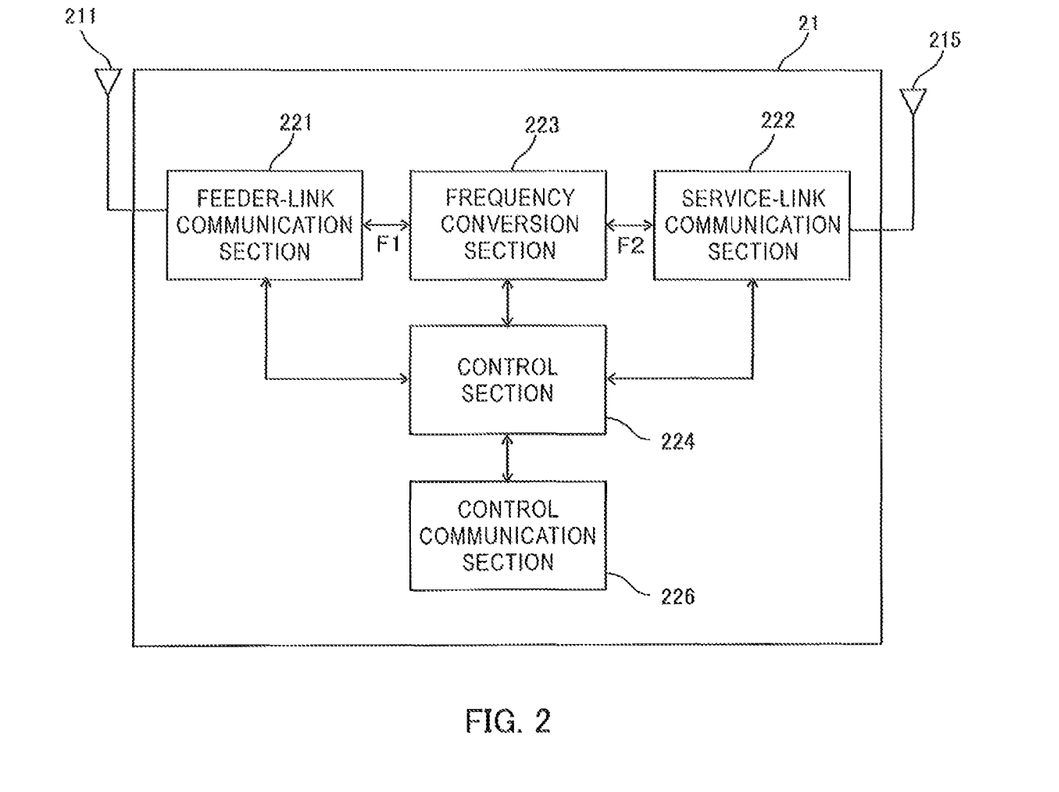
FIG. 2 is a block diagram showing an example of a main configuration of a relay communication station of a HAPS according to the embodiment.

FIG. 2 is an illustration showing an example of a main configuration of the relay communication station 21 of the HAPS 20 according to the embodiment. In FIG. 2, the relay communication station 21 is provided with a feeder-link communication section 221, a service-link communication section 222, a frequency conversion section 223, a control section 224 that controls each section, and a control communication section 226.

The feeder-link communication section 221 transmits and receives a radio signal of the feeder link frequency $F_{FL}$ to and from the GW station 70 via the FL antenna 211. The service-link communication section 222 transmits and receives a radio signal of the service link frequency $F_{SL}$ to and from the terminal apparatus 61 via the SL antenna 115.

The control section 224 may control the FL antenna 211 so as to track the GW station 70. By tracking the GW station 70 by the FL antenna 211, it is possible to suppress the deterioration of the communication quality of the feeder link due to the movement of the HAPS 20. As a control system of a directional beam of the FL antenna 211, various kinds of systems such as a gimbal system, an electric system (360-degrees beamforming control system), and an electric system (angle-limited beamforming control system+antenna switching) can be used.

The frequency conversion section 223 performs a frequency conversion between the feeder link frequency $F_{FL}$ (F1 in FIG. 2) and the service link frequency $F_{SL}$ (F2 in FIG. 2) between the feeder-link communication section 221 and the service-link communication section 222. The radio signal relayed by the relay communication station 21 may be transmitted and received using, for example, an OFMDA communication method conforming to the LTE or LTE-Advanced standard. In this case, a good communication quality can be maintained even if multipaths with different radio signal delays occur.

The control section 224 can control each section by executing a program incorporated in advance.

The control communication section 226 is configured with, for example, a mobile communication module having a communication function of the LTE or the next generation (for example, the 5th generation), a satellite communication function, or both communication functions, and is assigned terminal identification information (for example, IP address, telephone number, etc.) so as to communicate with the central control server 85. The MAC address of the communication interface may be used to identify the control communication section 226.

Figure 3:
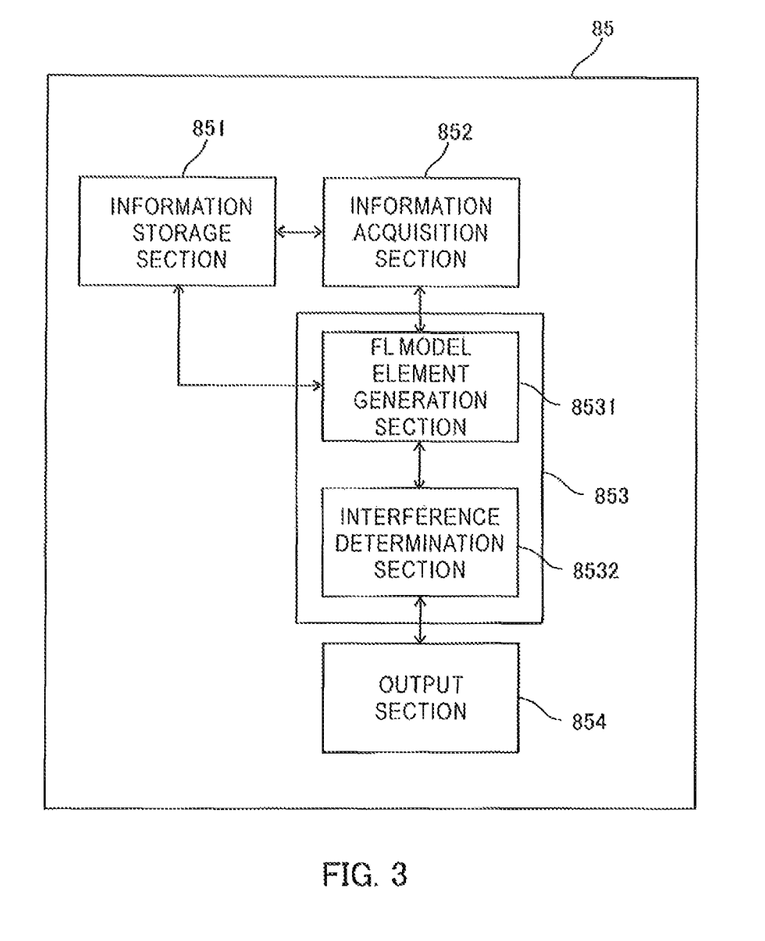
FIG. 3 is an illustration showing an example of a main configuration of a central control server according to the embodiment.

FIG. 3 is an illustration showing an example of a main configuration of the central control server 85 according to the embodiment. In FIG. 3, the central control server 85 is provided with an information storage section 851, an information acquisition section 852, an information processing section 853, and an output section 854.

The information storage section 851 stores the position information of the plural GW stations 70 that wirelessly communicate with each of the plural HAPSs 20.

The information acquisition section 852 acquires the position information of the current positions of the plural HAPSs 20. Acquisition of information from the HAPS 20 can be performed via, for example, an LTE communication line through the core network 80 of the mobile communication network, the base station 75, and the GW station 70. Acquisition of information from the HAPS 20 may be performed using a satellite line for mobile communication via an artificial satellite, or may be performed using a satellite line via the Internet 90 and an artificial satellite. Further, the position information of the HAPS 20 may be acquired from the server of the core network (mobile communication network) 80 or the server of the Internet 90.

The position information of the GW station 70 and the position information of the HAPS 20 are, for example, information on coordinates (x, y, z) in a three-dimensional Cartesian coordinate system (for example, ITRF (International Terrestrial Reference System)) in which the origin of coordinates is placed at the center of gravity of the earth. The position information may be information on the longitude, latitude and height in the earth coordinate system (also referred to as "geodetic coordinate system") based on a predetermined earth ellipsoid, or may be information on coordinates (r, θ, φ) in a polar coordinate system in which the origin of coordinates is placed at the center of gravity of the earth. The coordinates of these multiple types of coordinate systems can be converted to each other.

The information processing section 853 performs a real-time detection (detection of interference that is currently occurring) or a predictive detection (detection of interference that is predicted to occur) of interference between the feeder links of the plural HAPSs 20, based on the information stored in the information storage section 851 and the information acquired by the information acquisition section 852.

The information processing section 853 includes, for example, an FL-model element generation section 8531 and an interference determination section 8532. The FL-model element generation section 8531 calculates and generates plural feeder-link model elements ME corresponding to the plural HAPSs 20 in the three-dimensional space model, based on the position information of the plural HAPSs 20 and the position information of the plural GW stations 70. The feeder-link model element ME is a model element that combines a feeder-link receiving point P21 corresponding to the position of the HAPS 20, a feeder-link transmitting point P70 corresponding to the position of the GW station 70, and a line segment LS connecting the feeder-link receiving point P21 and the feeder-link transmitting point P70 to each other in the three-dimensional space model.

The three-dimensional space model is, for example, a space model defined on the three-dimensional Cartesian coordinate system. The three-dimensional space model may be a space model defined by the above-mentioned earth coordinate system (geodetic coordinate system) or polar coordinate system.

The interference determination section 8532 determines an occurrence of interference between the feeder links FL based on a distance D between the line segment LS and the feeder-link receiving point P21 among the plural feeder-link model elements (ME) different from each other on the three-dimensional space model. For example, in case that the distance D becomes a predetermined distance (for example, 100 m) or less, it is determined that an interference between the feeder links FL has occurred or is likely to occur.

The output section 854 outputs the determination result of the interference determination section 8532 to a display section (for example, a liquid crystal display) or the like. The output section 854 may output the three-dimensional space model having the plural feeder-link model elements (ME) and the occurrence status of interference to the display section (for example, a liquid crystal display) or the like for visualization, and may transmit to a preset operator's terminal apparatus for notification.

Figure 4:
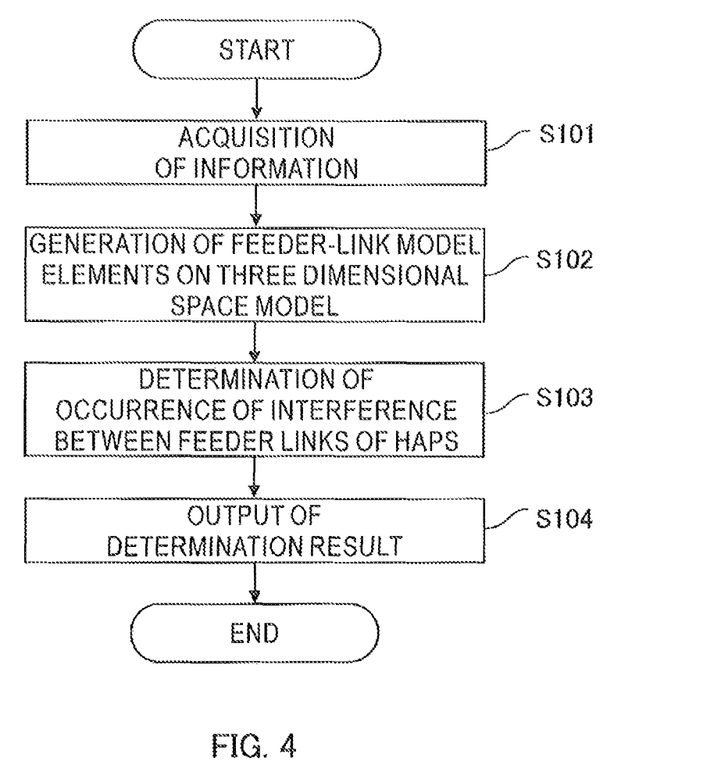
FIG. 4 is a flowchart showing an example of an interference detection by the central control server according to the embodiment.
Figure 5A:
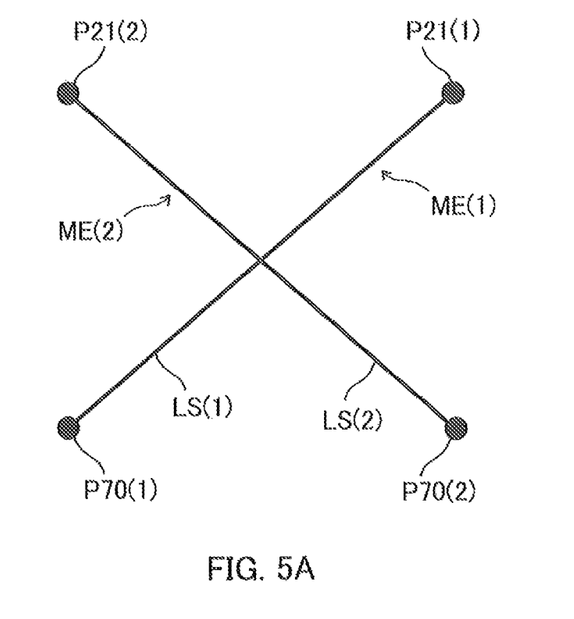
FIG. 5A is an illustration showing an example of plural feeder-link model elements corresponding to plural HAPSs in a three-dimensional space model used for the interference detection of FIG. 4.
Figure 5B:
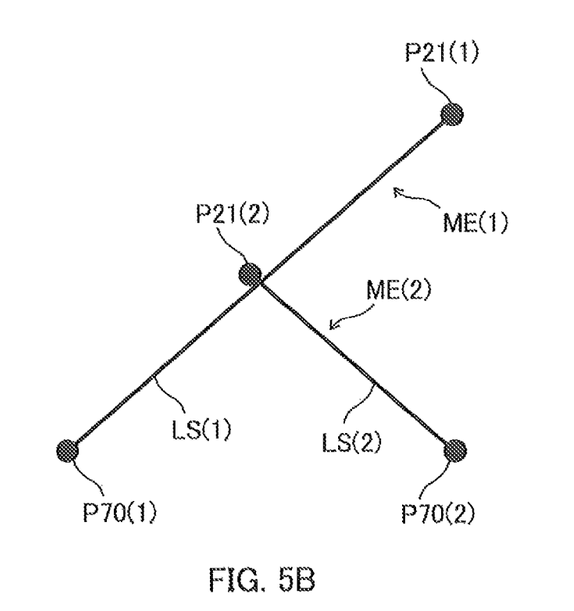
FIG. 5B is an illustration showing an example of plural feeder-link model elements corresponding to plural HAPSs in a three-dimensional space model used for the interference detection of FIG. 4.

FIG. 4 is a flowchart showing an example of interference detection by the central control server 85 according to the embodiment. FIG. 5A and FIG. 5B are illustrations showing an example of plural feeder-link model elements ME(1) and ME(2) corresponding to the plural HAPSs 20(1) and 20(2) in the three-dimensional space model used for the interference detection of FIG. 4. It is noted that, although FIG. 4, FIG. 5A and FIG. 5B are examples in the case where the number of HAPSs and feeder-link model elements is respectively 2, the number of HAPSs and feeder-link model elements may be respectively 3 or more.

In FIG. 4, the central control server 85 acquires and stores the position information on each of the GW stations 70(1) and 70(2) in advance. The central control server 85 acquires and stores the position information on the current position of each of the HAPSs 20(1) and 20(2) regularly at a predetermined timing or irregularly (S101).

Next, the central control server 85 generates plural feeder-link model elements ME(1) and ME(2) corresponding to the plural HAPSs 20(1) and 20(2) in the three-dimensional space model based on the position information of the GW stations 70(1) and 70(2) and the position information of the HAPSs 20(1) and 20(2) (S102) as shown in FIG. 5A and FIG. 5B, for example. Each of the plural feeder-link model elements ME(1) and ME(2) is a model element that combines feeder-link receiving points P21(1) and P21(2) corresponding to the positions of the HAPSs 20(1) and 20(2), feeder-link transmitting points P70(1) and P70(2) corresponding to the positions of the GW stations 70(1) and 70(2), and line segments LS(1) and LS(2) connecting the feeder-link receiving point and the feeder-link transmitting point to each other.

Next, the central control server 85 determines the occurrence of interference between the feeder links, based on the distances between the line segments LS(1) and LS(2) and the feeder-link receiving points P21(1) and P21(2) between the plural feeder-link model elements ME(1) and ME(2) that are different from each other on the three-dimensional space model (S103).

For example, in the example of FIG. 5A, although the line segments LS(1) and LS(2) of the feeder-link model elements ME(1) and ME(2) intersect each other, the line segment LS(1) corresponding to the HAPS 20(1) is not contact with the feeder-link receiving point P21(2) corresponding to the HAPS 20(2), and the line segment LS(2) corresponding to the HAPS 20(2) is not contact with the feeder-link receiving point P21(1) corresponding to the HAPS 20(1), so that it is determined that no interference between the feeder links has occurred.

On the other hand, in the example of FIG. 5B, the line segment LS(1) corresponding to the HAPS 20(1) contacts the feeder-link receiving point P21(2) corresponding to the HAPS 20(2), so that it is determined that an interference between the feeder links has occurred.

Next, the central control server 85 outputs the determination result of the occurrence of interference between the feeder links (S104). For example, the three-dimensional space model having the plural feeder-link model elements ME(1) and ME(2) and the determination result status of the occurrence of interference are outputted to a display section (for example, a liquid crystal display) or the like for visualization, and transmitted to a preset operator's terminal apparatus for notification.

Figure 6A:
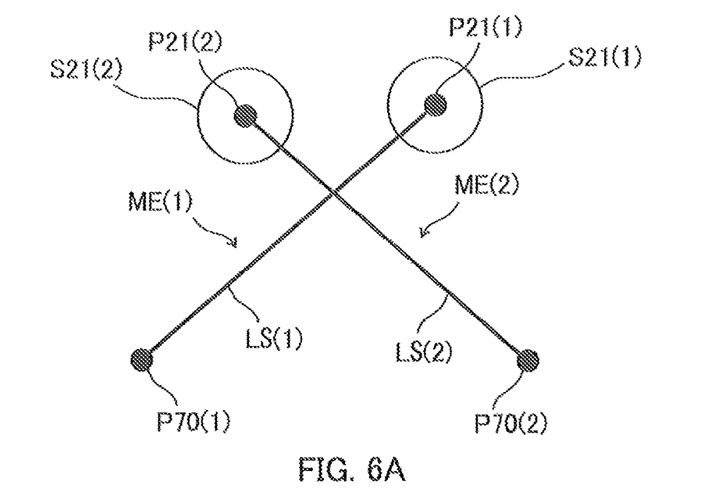
FIG. 6A is an illustration showing another example of plural feeder-link model elements corresponding to plural HAPSs in a three-dimensional space model used for the interference detection of FIG. 4.
Figure 6B:
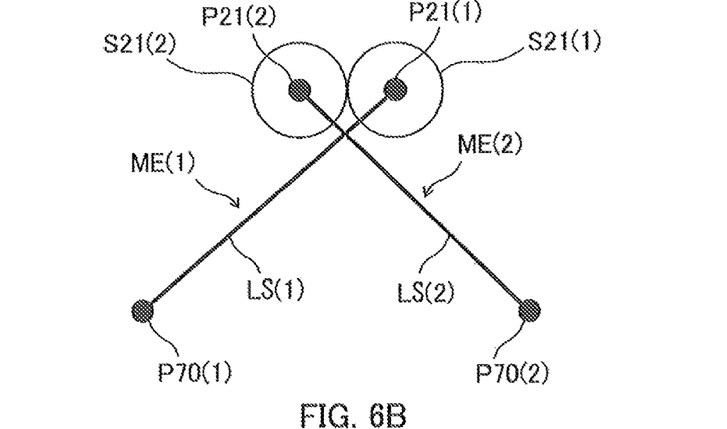
FIG. 6B is an illustration showing another example of plural feeder-link model elements corresponding to plural HAPSs in a three-dimensional space model used for the interference detection of FIG. 4.
Figure 6C:
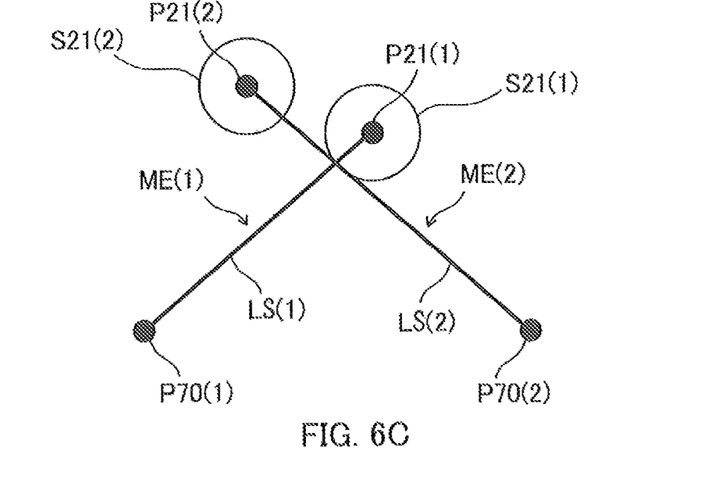
FIG. 6C is an illustration showing another example of plural feeder-link model elements corresponding to plural HAPSs in a three-dimensional space model used for the interference detection of FIG. 4.

FIG. 6A to FIG. 6C are illustrations showing other examples of the plural feeder-link model elements ME(1) and ME(2) corresponding to the plural HAPSs 20(1) and 20(2) in the three-dimensional space model used for the interference detection of FIG. 4. In the illustrated example, the feeder-link model elements ME(1) and ME(2) in the three-dimensional apace model are generated by further combining the spheres S21(1) and S21(2) centered on the feeder-link receiving points P21(1) and P21(2) to the feeder-link receiving points P21(1) and P21(2), feeder-link transmitting points P70(1) and P70(2), and the line segments LS(1) and LS(2).

For example, in the example of FIG. 6A, although the line segments LS(1) and LS(2) of the feeder-link model elements ME(1) and ME(2) intersect each other, the line segment LS(1) and the sphere S21(1) corresponding to the HAPS 20(1) are not in contact with the sphere S21(2) corresponding to the HAPS 20(2), and the line segment LS(2) and the sphere S21(2) corresponding to the HAPS 20(2) are not in contact with the sphere S21(1) corresponding to the HAPS 20(1), so that it is determined that no interference between the feeder links has occurred.

In the example of FIG. 6B, since the sphere S21(1) corresponding to the HAPS 20(1) is in contact with the sphere S21(2) corresponding to the HAPS 20(2), it is determined that an interference between the feeder links has occurred. In the example of FIG. 6C, since the line segment LS(2) corresponding to the HAPS 20(2) is in contact with the sphere S21(1) corresponding to the HAPS 20(1), it is determined that an interference between the feeder links has occurred.

By using the feeder-link model elements ME(1) and ME(2) having the spheres S21(1) and S21(2) exemplified in FIG. 6A to FIG. 6C, an interference between the feeder links can be detected in an early stage.

Figure 7:
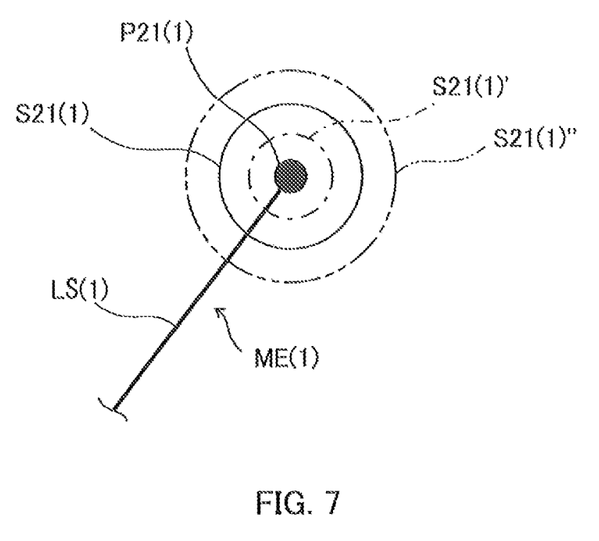
FIG. 7 is an illustration showing another example of a sphere in the feeder-link model elements exemplified in FIG. 6A to FIG. 6C.

FIG. 7 is an illustration showing another example of a sphere in the feeder-link model elements exemplified in FIG. 6A to FIG. 6C. In the example of FIG. 7, the radius of the sphere S21(1) of the feeder-link model element ME(1) is changed depending on the required sensitivity of interference detection between the feeder links as shown in the spheres S21(1), S21(1)' and S21(1)". For example, in case that the required sensitivity for interference detection between feeder links is a standard sensitivity, the feeder-link model element ME(1) having the sphere S21(1) with a standard radius (for example, 100 m) in the figure is generated, and in case that detecting an interference between feeder links with higher sensitivity, the feeder-link model element ME(1) having the sphere S21(1)' with a radius (for example, 500 m) larger than that of the standard sphere S21(1) is generated. On the other hand, in case that reducing the sensitivity of interference detection between feeder links, the feeder-link model element ME(1) having the sphere S21(1)" with a radius (for example, 50 m) smaller than that of the standard sphere S21(1) or the feeder-link model element ME(1) without combining a sphere is generated.

Figure 8:
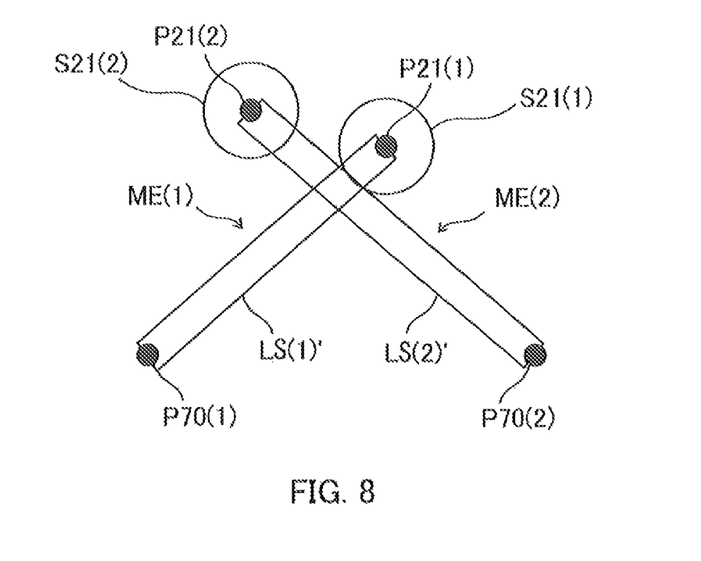
FIG. 8 is an illustration showing yet another example of plural feeder-link model elements corresponding to the plural HAPSs in a three-dimensional space model used for the interference detection of FIG. 4.
Figure 9:
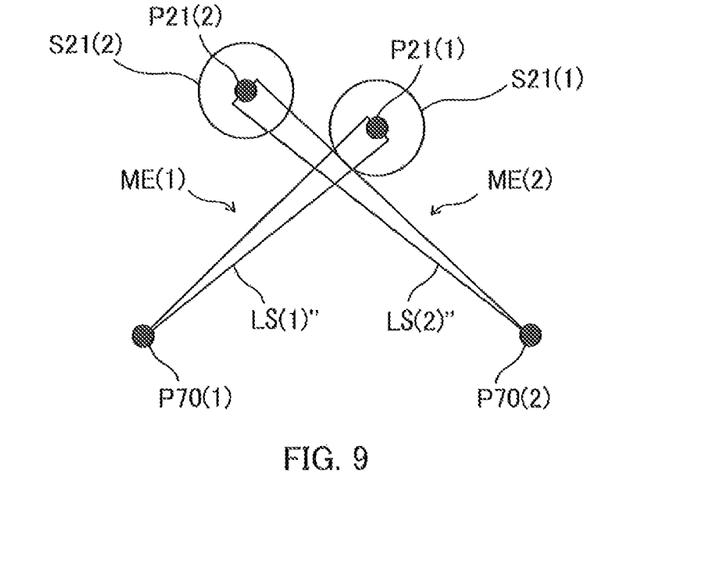
FIG. 9 is an illustration showing yet another example of plural feeder-link model elements corresponding to the plural HAPSs in a three-dimensional space model used for the interference detection of FIG. 4.

Each of FIG. 8 and FIG. 9 is an illustration showing yet another example of plural feeder-link model elements ME(1) and ME(2) corresponding to the plural HAPSs 20(1) and 20(2) in the three-dimensional space model used for the interference detection of FIG. 4. Since each of the line segments LS(1) and LS(2) of the feeder-link model elements ME(1) and ME(2) has a shape corresponding to the transmission beams of the feeder links FL(1) and FL(2) from the GW stations 70(1) and 70(2), it is possible to improve an accuracy of detecting the interference occurrence between the feeder links.

For example, as shown in FIG. 8, the line segments LS(1)' and LS(2)' of the feeder-link model elements ME(1) and ME(2) may have a cylindrical shape with a predetermined radius, and each of the both ends of the central axis may be located at the feeder-link receiving points P21(1) and P21(2) and the feeder-link transmitting points P70(1) and P720(2). In the example of FIG. 8, an outer peripheral surface of the cylindrical line segment LS(2)' corresponding to the HAPS 20(2) is in contact with the sphere S21(1) corresponding to the HAPS 20(1), so that it is determined that an interference between the feeder links has occurred.

As shown in FIG. 9, the line segments LS(1)" and LS(2)" of the feeder-link model elements ME(1) and ME(2) may have a conical shape (tapered shape), an apex of the conical shape may be located at the feeder-link transmitting points P70(1) and P70(2), and a bottom surface thereof may be located at the feeder-link receiving points P21(1) and P21(2). In the example of FIG. 9, since an outer peripheral slope of the conical shape (tapered shape) line segment LS(2)" corresponding to the HAPS 20(2) is in contact with the sphere S21(1) corresponding to the HAPS 20(1), it is determined that an interference between the feeder links has occurred.

It is noted that, in the present embodiment, the FL-model element generation section 8531 in the information processing section 853 of the central control server 85 may generate by predicting the movement of plural feeder-link model elements ME in the three-dimensional space model, based on flight-influence condition parameters including at least one of flight schedule information (flight schedule information, flight plan) of each HAPS 20, meteorological conditions affecting the flight of each HAPS 20, and altitude and velocity of each HAPS 20. Then, the interference determination section 8532 may predict the occurrence of interference between the feeder links FL based on the prediction results of the movements of the plural feeder-link model elements ME (interference prediction detection).

Moreover, in the present embodiment, the FL-model element generation section 8531 in the information processing section 853 of the central control server 85 may generate by predicting the movements of the feeder-link model elements ME of the plural HAPSs, based on past data showing a relationship between the flight-influence condition parameters and the flight path (flight schedule information, flight schedule information such as flight plan, and flight route information that actually flew) of the HAPS 20. For example, a machine learning is performed on a large number of past data showing the relationship between the flight-influence condition parameters (for example, weather conditions, altitude and velocity of each HAPS 20, etc.) and the flight path (target-flight route information and flight route information that actually flew) of the HAPS 20. Then, the FL-model element generation section 8531 may generate by predicting the movements of the feeder-link model elements ME of the plural HAPSs or may perform a determination of the interference occurrence between the feeder links, based on the trained model obtained by machine learning, the information on the current position of the HAPS 20, the current flight-influence condition parameters, and the flight schedule information (flight schedule information, flight plan, etc.) of the HAPS 20. As an algorithm of the machine learning, for example, an algorithm of supervised learning, unsupervised learning or reinforcement learning can be used. Further, the algorithm of the machine learning may be a support vector machine, a decision tree such as a random forest, a neural network, or an algorithm such as deep learning.

As described above, it is possible to detect the interference between the feeder links FL of the plural HAPSs 20 that are likely to occur when the number of the HAPS 20 moving in the upper airspace increases, according to the present embodiment.

It is noted that, the process steps and configuration elements of the relay communication station of the communication relay apparatus such as the HAPS, the feeder station, the gateway station, the management apparatus, the monitoring apparatus, the remote control apparatus, the server, the terminal apparatus (user apparatus, mobile station, communication terminal), the base station, the base station apparatus, the RRH and the BBU described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, radio relay station, feeder station, gateway station, base station, base station apparatus, radio-relay station apparatus, terminal apparatus (user apparatus, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

20 HAPS (communication relay apparatus)
21 relay communication station
61, 61(1), 61(2) terminal apparatus
70, 70(1), 70(2) gateway station (GW station)
71, 71(1), 71(2) antenna for feeder link (GW antenna)
75, 75(1), 75(2) base station
76, 76(1), 76(2) remote radio head (RRH)
77, 77(1), 77(2) baseband unit (BBU)
85 central control server
200C, 200C(1), 200C(2) three dimensional cell
200F, 200F(1), 200F(2) foot print
211 antenna for feeder link (FL antenna)
215 antenna for service link (SL antenna)
221 feeder-link communication section
222 service-link communication section
223 frequency conversion section
224 control section
226 control communication section
851 information storage section
852 information acquisition section
853 information processing section
8531 feeder link (FL) model element generation section
8532 interference determination section
854 output section

The invention claimed is:

1. An interference detection system for detecting an interference between feeder links of plural movable aerial-staying type communication relay apparatuses, each of the communication relay apparatus including a relay communication station that relays a radio communication of a terminal apparatus, the interference detection system comprising:
   an information storage section that stores position information of plural gateway stations for respectively performing a radio communication with the plural communication relay apparatuses;
   an information acquisition section that acquires position information on current positions of the plural communication relay apparatuses;
   a generation section that generates plural feeder-link model elements with respect to the plural communication relay apparatuses based on the position information of the plural communication relay apparatuses and the position information of the plural gateway stations, each of the plural feeder-link model elements combining a feeder-link receiving point corresponding to the position of the communication relay apparatus, a feeder-link transmitting point corresponding to the position of the gateway station and a line segment connecting the feeder-link receiving point and the feeder-link transmitting points to each other in a three-dimensional space model; and
   a determination section that determines an occurrence of interference between the feeder links based on distances between the line segment and the feeder-link receiving point among the plural feeder-link model elements different from each other on the three-dimensional space model.

2. The interference detection system according to claim 1, wherein the generation section generates the feeder-link model element by further combining with a sphere centered on the feeder-link receiving point, and
   wherein the determination section determines the occurrence of interference between the feeder links based on a contact between the line segment and the sphere among the plural feeder-link model elements different from each other on the three-dimensional space model.

3. The interference detection system according to claim 2, wherein the generation section changes a radius of the sphere of the feeder-link model element depending on a required sensitivity of an interference detection between the feeder links.

4. The interference detection system according to claim 1, wherein the line segment includes a shape corresponding to a transmission beam of the feeder link from the gateway station.

5. The interference detection system according to claim 1, further comprising an output section that outputs at least one of a determination result of the interference occurrence between the feeder links and the plural feeder-link model elements in the three-dimensional space model.

6. The interference detection system according to claim 1, wherein the generation section generates by predicting movements of the plural feeder-link model elements based on a flight-affecting condition parameter including at least one of flight schedule information of the communication relay apparatus, a meteorological condition affecting the flight of the communication relay apparatus, and an altitude and a velocity of the communication relay apparatus, and
   wherein the determination section predicts the occurrence of an interference between the feeder links based on a prediction result of the movements of the plural feeder-link model elements.

7. The interference detection system according to claim 6, wherein the interference detection system predicts the movements of the plural feeder-link model elements or the interference occurrence between the feeder links based on past data indicating a relationship between the flight-affecting condition parameter and a flight path of the communication relay apparatus.

8. The interference detection system according to claim 2, wherein the line segment includes a shape corresponding to a transmission beam of the feeder link from the gateway station.

9. The interference detection system according to claim 2, further comprising an output section that outputs at least one of a determination result of the interference occurrence between the feeder links and the plural feeder-link model elements in the three-dimensional space model.

10. The interference detection system according to claim 2,
wherein the generation section generates by predicting movements of the plural feeder-link model elements based on a flight-affecting condition parameter including at least one of flight schedule information of the communication relay apparatus, a meteorological condition affecting the flight of the communication relay apparatus, and an altitude and a velocity of the communication relay apparatus, and
wherein the determination section predicts the occurrence of an interference between the feeder links based on a prediction result of the movements of the plural feeder-link model elements.

11. The interference detection system according to claim 3,
wherein the line segment includes a shape corresponding to a transmission beam of the feeder link from the gateway station.

12. The interference detection system according to claim 3, further comprising an output section that outputs at least one of a determination result of the interference occurrence between the feeder links and the plural feeder-link model elements in the three-dimensional space model.

13. The interference detection system according to claim 3,
wherein the generation section generates by predicting movements of the plural feeder-link model elements based on a flight-affecting condition parameter including at least one of flight schedule information of the communication relay apparatus, a meteorological condition affecting the flight of the communication relay apparatus, and an altitude and a velocity of the communication relay apparatus, and
wherein the determination section predicts the occurrence of an interference between the feeder links based on a prediction result of the movements of the plural feeder-link model elements.

14. The interference detection system according to claim 13,
wherein the interference detection system predicts the movements of the plural feeder-link model elements or the interference occurrence between the feeder links based on past data indicating a relationship between the flight-affecting condition parameter and a flight path of the communication relay apparatus.

15. The interference detection system according to claim 4, further comprising an output section that outputs at least one of a determination result of the interference occurrence between the feeder links and the plural feeder-link model elements in the three-dimensional space model.

16. The interference detection system according to claim 4,
wherein the generation section generates by predicting movements of the plural feeder-link model elements based on a flight-affecting condition parameter including at least one of flight schedule information of the communication relay apparatus, a meteorological condition affecting the flight of the communication relay apparatus, and an altitude and a velocity of the communication relay apparatus, and
wherein the determination section predicts the occurrence of an interference between the feeder links based on a prediction result of the movements of the plural feeder-link model elements.

17. The interference detection system according to claim 5,
wherein the generation section generates by predicting movements of the plural feeder-link model elements based on a flight-affecting condition parameter including at least one of flight schedule information of the communication relay apparatus, a meteorological condition affecting the flight of the communication relay apparatus, and an altitude and a velocity of the communication relay apparatus, and
wherein the determination section predicts the occurrence of an interference between the feeder links based on a prediction result of the movements of the plural feeder-link model elements.

18. The interference detection system according to claim 10,
wherein the interference detection system predicts the movements of the plural feeder-link model elements or the interference occurrence between the feeder links based on past data indicating a relationship between the flight-affecting condition parameter and a flight path of the communication relay apparatus.

19. An interference detection method for detecting an interference between feeder links of plural movable aerial-staying type radio relay apparatuses, each of the communication relay apparatus including a relay communication station that relays a radio communication of a terminal apparatus, the interference detection method comprising:
storing position information of plural gateway stations that respectively perform a radio communication with the plural communication relay apparatuses;
acquiring position information on current positions of the plural communication relay apparatuses;
generating plural feeder-link model elements with respect to the plural communication relay apparatuses based on the position information of the plural communication relay apparatuses and the position information of the plural gateway stations, each of the plural feeder-link model elements combining a feeder-link receiving point corresponding to a position of the communication relay apparatus, a feeder-link transmitting point corresponding to a position of the gateway station, and a line segment connecting the feeder-link receiving point and the feeder-link transmitting points to each other in a three-dimensional space model; and
determining an occurrence of interference between the feeder links based on distances between the line segment and the feeder-link receiving point among the plural feeder-link model elements different from each other on the three-dimensional space model.

20. A non-transitory computer readable medium coupled to a processor installed in an interference detection system, the non-transitory computer readable medium containing software that detects an interference between feeder links of plural movable aerial-staying type radio relay apparatuses, each of the communication relay apparatuses including a relay communication station that relays a radio communication of a terminal apparatus, the software comprising:
executable code that generates plural feeder-link model elements with respect to the plural communication relay apparatuses based on position information of the plural communication relay apparatuses and position information of plural gateway stations respectively performing a radio communication with the plural communication relay apparatuses, each of the plural feeder-link model elements combining a feeder-link receiving point corresponding to a position of the communication relay apparatus, a feeder-link transmitting point corresponding to a position of the gateway station, and a line segment connecting the feeder-link receiving point and the feeder-link transmitting point to each other in a three-dimensional space model; and executable code that determines an occurrence of interference between the feeder links based on distance between the line segment and the feeder-link receiving point among the plural feeder-link model elements different from each other on the three-dimensional space model.

* * * * *